United States Patent [19]

Schubert

[11] Patent Number: 5,713,449
[45] Date of Patent: Feb. 3, 1998

[54] SINGLE-PIECE COVER FOR A CLUTCH MECHANISM AND A CLUTCH MECHANISM HAVING SUCH A COVER

[75] Inventor: Florian Schubert, Amiens, France

[73] Assignee: VALEO, Paris Cedex, France

[21] Appl. No.: 596,282

[22] PCT Filed: Jun. 13, 1995

[86] PCT No.: PCT/FR95/00769

§ 371 Date: Feb. 8, 1996

§ 102(e) Date: Feb. 8, 1996

[87] PCT Pub. No.: WO95/34766

PCT Pub. Date: Dec. 21, 1995

[30] Foreign Application Priority Data

Jun. 13, 1994 [FR] France .................. 94 07410

[51] Int. Cl.$^6$ .................. F16D 13/58; F16D 13/71
[52] U.S. Cl. .................. 192/70.19; 192/70.27
[58] Field of Search .................. 192/70.27, 89.23, 192/89.24, 70.18, 70.16, 70.19

[56] References Cited

U.S. PATENT DOCUMENTS

| | | | |
|---|---|---|---|
| 2,277,273 | 3/1942 | Spase | 192/70.27 X |
| 4,069,905 | 1/1978 | De Gennes | 192/70.18 X |
| 4,593,803 | 6/1986 | Valier | 192/70.18 X |
| 4,601,373 | 7/1986 | Despres et al. | 192/70.18 |
| 4,655,334 | 4/1987 | Valier | 192/89.24 |
| 5,501,312 | 3/1996 | Mizukami et al. | 192/89.23 |

FOREIGN PATENT DOCUMENTS

| | | |
|---|---|---|
| 0183578 | 6/1986 | European Pat. Off. . |
| 0198747 | 10/1986 | European Pat. Off. .......... 192/70.27 |
| 2300933 | 9/1976 | France . |
| 2 572 480 | 5/1986 | France . |
| 2197918 | 6/1988 | United Kingdom . |

*Primary Examiner*—Rodney H. Bonck
*Attorney, Agent, or Firm*—Longacre & White

[57] ABSTRACT

Cover with, on its external periphery, an alternation of radial surfaces (7) for coupling to a thrust plate (4) and areas (8) for fixing to a reaction plate (1), each fixing area (8) having an axial bracing area (81, 82) opposite a radial bearing surface (91) having a plurality of holes (92) for fixing members (10) to pass. Each bracing area has an alternation of internal stiffening ribs (82) and external stiffening ribs (81). The coupling surfaces (7) are delimited circumferentially by internal stiffening ribs (82), which connect a coupling surface (7) to the adjacent external stiffening ribs (81), and the internal stiffening ribs (81) are inclined in the axial direction going from their free end to the radial bearing surface of the bracing areas (81, 82).

5 Claims, 4 Drawing Sheets

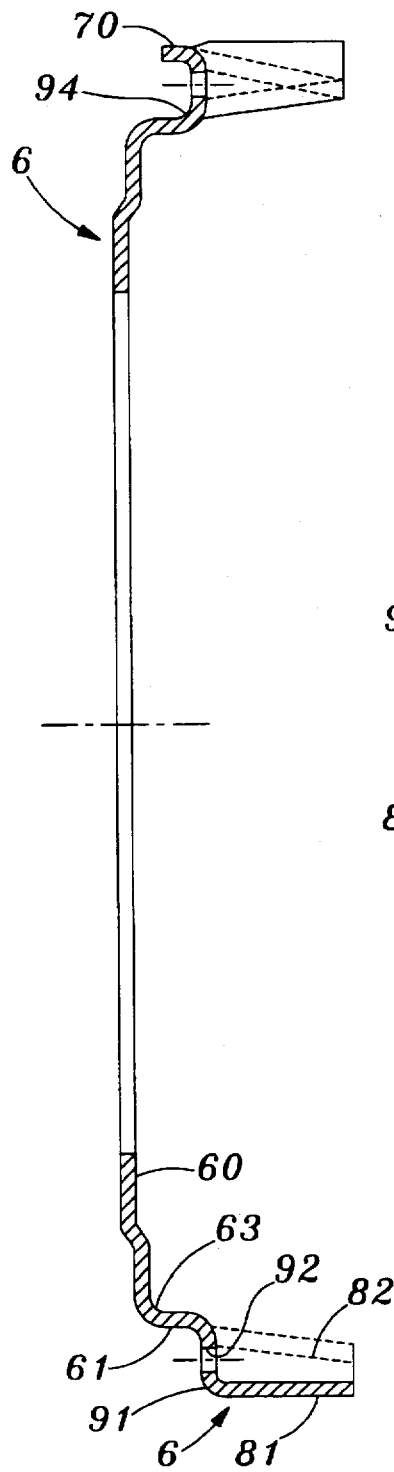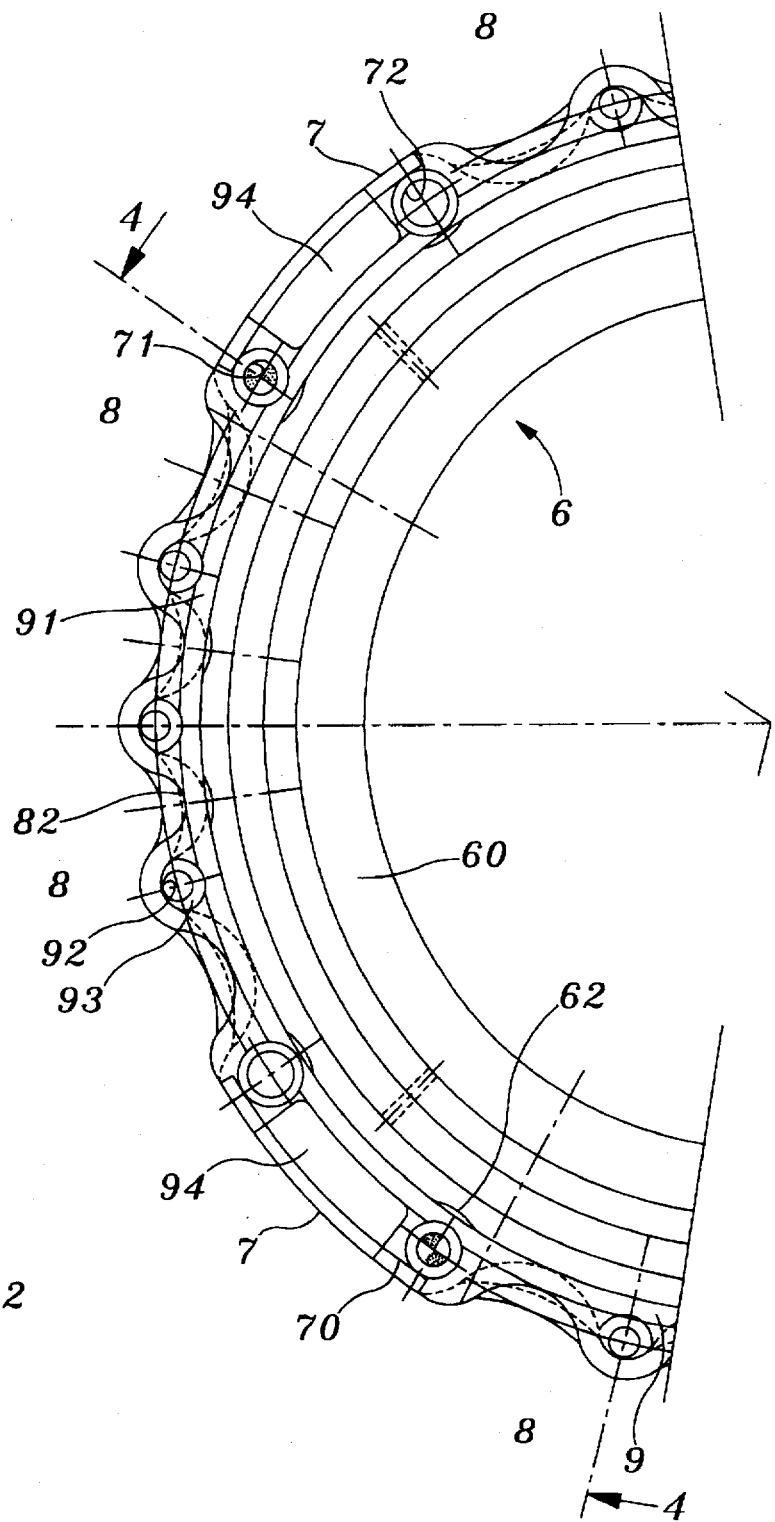

SINGLE-PIECE COVER FOR A CLUTCH MECHANISM AND A CLUTCH MECHANISM HAVING SUCH A COVER

BACKGROUND OF THE INVENTION

1. Field of the Invention

The present invention concerns a single-piece cover for a clutch mechanism, notably for motor vehicles, and the clutch mechanisms having such a cover, as described for example in the document FR-A-2 572 480 (U.S. Pat. No. 4,655,334).

2. Description of Related Art

In this document the single-piece cover has at its circumference (at its external periphery) an alternation of radial surfaces for coupling to a thrust plate and areas for fixing to a reaction plate.

Each fixing area has an axially oriented bracing area, opposite a radial bearing surface, which has a plurality of holes for fixing members to pass through, usually fixing screws or rivets.

The bracing area has a corrugated shape and has an alternation of internal stiffening ribs and external stiffening ribs carrying centring surfaces.

This bracing area is designed to cooperate by nesting with a peripheral axial extension of the reaction plate, for bearing and centring on the said plate, whilst the fixing members are designed to be fixed in the reaction plate and bear on radial fixing areas, which each radial bearing surface has around each passage hole.

The end part of the bracing area (its free end) bears for this purpose on the reaction plate, the centring being achieved by means of centring surfaces machined on the end parts of the external stiffening ribs of the bracing area.

In practice the two circumferential ends of the bracing area are connected by end reliefs to the adjacent coupling surfaces, and the external stiffening ribs have a larger circumferential extent than the internal stiffening ribs, because a bending hole is formed partly in each external stiffening rib.

Such an arrangement gives satisfaction; nevertheless, under severe conditions of use, a flexion of the bracing areas can occur, giving rise to defects in parallelism to the detriment of correct functioning of the clutch.

SUMMARY OF THE INVENTION

The object of the present invention is to mitigate this drawback and therefore to increase the radial stiffness of the cover, simply and economically.

According to the invention, a cover of the type indicated above is characterised in that the radial coupling surfaces are delimited circumferentially by internal stiffening ribs, which connect a said coupling surface to the adjacent external stiffening ribs and in that the internal stiffening ribs are inclined in the axial direction going from their free end to the radial bearing surface of the bracing areas.

According to the invention a clutch mechanism is characterised in that it has a cover according to the invention.

By virtue of the invention the radial stiffness of the cover is increased notably because the bracing areas are connected to the radial coupling surfaces by internal ribs on the bracing areas.

In addition the inclination of the internal stiffening ribs enables the radial bearing surfaces to be well supported.

This inclination makes it possible to have, at the thrust plate, a maximum friction area for the friction linings of the friction disc associated with the mechanism, whilst having deep internal ribs at the radial bearing surface of the bracing area, without having to produce slots for bending.

It will be appreciated that this stiffening of the cover has an influence with regard to the correct functioning of the clutch and the geometry, in service, of the retaining ring which the cover carries for supporting the diaphragm which the clutch mechanism usually includes.

By virtue of the invention, because of the stiffening of the cover, the corrugations in the supporting retaining ring at the level of the cover are reduced in service.

According to another characteristic the internal stiffening ribs splay out in the axial direction going from their free end to the radial bearing surface of the bracing areas.

By virtue of this arrangement the radial bearing areas for the fixing members have a reduced circumferential width and the free end of the external ribs has a larger circumferential width.

Thus, benefiting from the inclination of the internal ribs, there are obtained, on the one hand, extensive bearing areas allowing good nesting of the cover in the reaction plate, and on the other hand very rigid radial bearing areas.

Advantageously the radial coupling surfaces are provided at their external periphery with an axially oriented stiffening shoulder extending in the direction of the base of the cover.

By virtue of this arrangement the external periphery of the cover is stiffened still further.

In one embodiment the local pressings that the skirt of the cover has at the point where it joins the base of the cover, are located in the vicinity of the bottom of the internal ribs so that the said axial projections, which are designed to centre the aforementioned retaining ring and which are formed on the internal face of the cover by means of local pressings, enclose a radial bearing area for the fixing members.

By virtue of this arrangement the geometry of the retaining ring is improved still further in service.

BRIEF DESCRIPTION OF THE DRAWINGS

The following description illustrates the invention with regard to the accompanying drawings in which:

FIG. 3 is a partial front view of the cover according to the invention;

FIG. 4 is a view in section along the line 4—4 in FIG. 3;

DETAILED DESCRIPTION OF PREFERRED EMBODIMENTS

Figure 1:
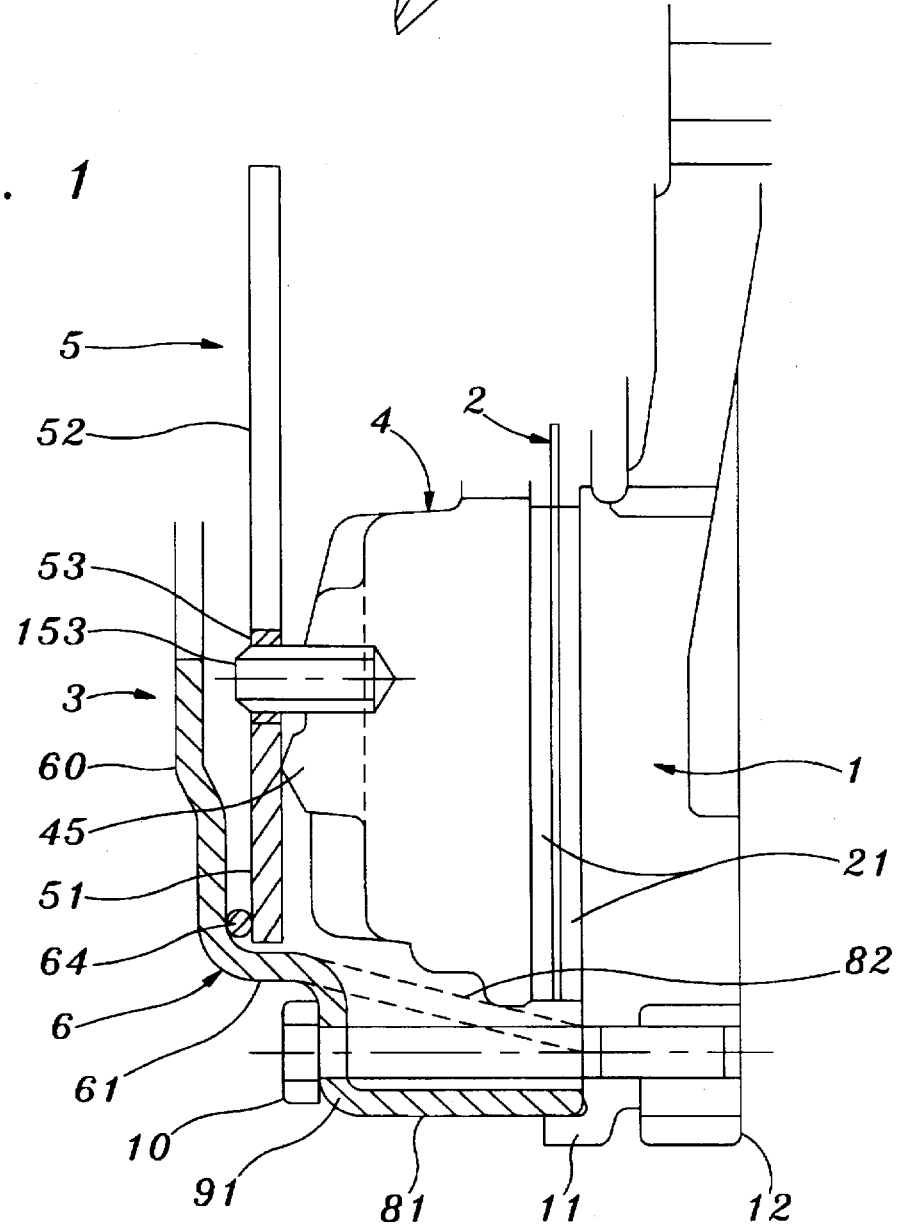
FIG. 1 is a half-view in axial section of a cover according to the invention integrated into a clutch mechanism which is in other respects known per se, the said view showing a bracing area.
Figure 2:
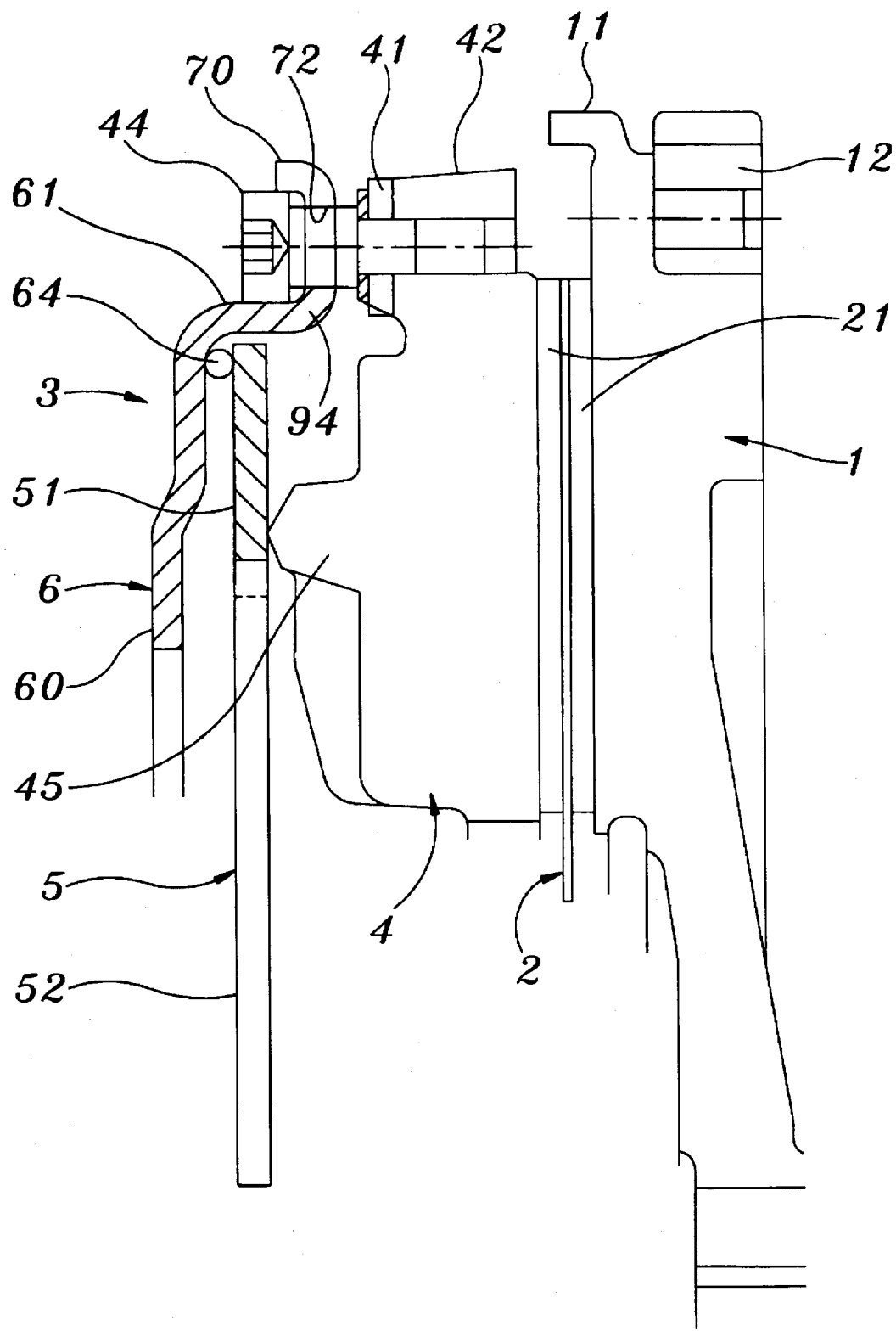
FIG. 2 is a half-view similar to FIG. 1 showing a radial coupling surface.

In FIG. 1, a friction clutch can be seen, having in succession axially, a reaction plate 1 designed to be locked with respect to rotation to a driving shaft, a friction disc 2, designed to be locked with respect to rotation to a driven shaft, and a unitary assembly 3, referred to as the clutch mechanism, having a single-piece cover 6, by means of the external periphery of which it is designed to be fixed, by means of fixing members 10, such as screws, rivets, bolts or the like, to the reaction plate 1.

Since this a clutch for a motor vehicle, the reaction plate 1 is designed here to be fixed to the crankshaft of the vehicle engine, whilst the friction disc 2 is designed to be connected with respect to rotation to the gearbox input shaft.

More precisely, the reaction plate 1 carries a starter ring 12 and has at its external periphery an axially oriented annular shoulder 11, taking part in the centring of the clutch mechanism 3.

This mechanism has a set of annular parts, namely a thrust plate 4, a diaphragm 5 and the single-piece cover 6 made from material which can be pressed out, in this case sheet metal.

The thrust plate 4 is connected with respect to rotation to the cover 6, whilst being mounted so as to be axially mobile with respect to the latter by means of tangential elastic tongues 41 extending substantially tangentially with respect to the plate 4 and cover 6.

The diaphragm 5 is interposed axially between the cover 6 and plate 4. It bears on the cover 6 to act on the plate 4 and push the latter in the direction of the reaction plate 1 in order to grip friction linings 21, which the disc 2 has at its external periphery, between the reaction plate 1 and thrust plate 4.

For this purpose the diaphragm 5 has, in a manner known per se, at its external periphery, a part in the form of a Belleville washer 51. Here the external periphery of this washer 51 bears on a retaining ring 64 centred and carried by the cover 6, or as a variant on a pressing formed in the cover 6, whilst the internal periphery of this washer 51 bears on an annular protrusion 45, here divided into annual sectors, on the thrust plate 4.

As a variant the washer 51 bears at its external periphery on the annular protrusion on the thrust plate 4 and at its internal periphery on a primary support carried by the cover 6, the diaphragm being mounted pivotally on the cover 6 between the said primary support and a secondary support carried by the cover 6 by means of lugs formed from the latter by cutting and bending or cramps attached to the cover as described for example in the document FR-A-2 300 933 (U.S. Pat. No. 4,069,905).

In all cases the diaphragm has a central part, internally extending its washer 51, divided into radial fingers 52 by slots each opening out at one of their ends into a central opening in the diaphragm and at their other end into a broadened orifice 53 formed at the internal periphery of the washer 51.

In the figures illustrated, these orifices 53 are used in order to install, in a manner known per se, split pins 153 anchored in the thrust plate 4 in order to prevent any rotation of the diaphragm 5.

The diaphragm 5 in both cases allows clamping of the friction linings 21 between the plates 1, 4, the clutch thus being normally engaged.

In order to disengage it, it is necessary to act, by means of a release bearing (not shown), on the inner end of the fingers 52 of the diaphragm 5, either in traction in the case of a clutch of the drawn type, depicted in the figures, or by pushing in the case of a clutch of the pushed type described as a variant.

At the time of this manoeuvre the tongues 41 return the thrust plate 4 in the direction of the base 60 on the cover 6, given that these tongues are each fixed in this case at one of their ends by rivets (not visible) to a radial surface 7 for coupling the cover 6, and at their other end by studs 44 to a radial lug 42, which the plate 4 has for this purpose at its external periphery.

For this purpose, each radial coupling surface 7 has a radial area 94 provided with a hole 71 for the relevant rivet to pass and a hole 72 for the stud 44 to pass, the head of which bears on the said area 94 when the mechanism 3 is in the free state (not mounted on the reaction plate 1) in order, in a manner known per se, to protect the tongues 41.

The cover 6 has, in addition to its base 60, with a central hole and oriented transversely overall, an axially oriented annular skirt 61 directed towards the pressure plate 4 and connected to the external periphery of the base 6. The skirt 61 surrounds the diaphragm 5 belonging to axially acting elastic means acting between the plate 4 and the base 60 of the cover 6. This skirt 61 has, at the point where it joins the base 60, local hollows 62, obtained by blows of a punch, in order to form, on the internal face of the cover 6, axial projections 63, which are designed to centre the aforementioned retaining ring 64 bearing on the base 60.

The skirt 61 is connected to an external peripheral part 91, 94 oriented transversely overall. Thus the annular cover 6 has on each side of its skirt 61 a base 60 directed radially towards the axis of the assembly and an external peripheral part 91, 94 directed radially in the opposite direction to the axis of the assembly.

The external peripheral part has an alternation of areas 8 for fixing to the reaction plate 1 and radial surfaces 7 for coupling to the plate 4.

Here the distribution is regular and four coupling surfaces 7 are provided, a set of tongues 41 being associated with each surface 6. Each set here has at least two tongues 41 placed one above the other. Naturally this depends on the application.

Each fixing area 8 has an axially oriented bracing area 81, 82, normally referred to as a raising block, projecting axially in the direction of the reaction plate with respect to a radial surface 91 to which it is connected in a single piece. The area 81, 82 is able to cooperate by nesting with the annular shoulder 11 on the reaction plate 1, to centre the cover 6 and mechanism 3 on the plate 1.

For this purpose the area 81, 82 is able, by means of external ribs 81, to cooperate with the internal periphery of the flange 11 in order to centre it.

The end part (the free end) of the area 81, 82 bears on the reaction plate 1, or more precisely on the face thereof forming the friction face for the friction linings 21.

Thus the bracing area extends (FIG. 1) radially above the thrust plate 4 and linings 21. The area 81, 82 partially surrounds the said parts.

Each radial surface 91 of the areas 8 has holes 92, in this case three holes, designed each to allow passage of a member 10 for fixing the mechanism 3 to the plate 1. Here the members 10 consist of fixing screws screwed into a corresponding threaded bore formed in the plate 1 and in the ring 12.

As a variant they can be rivets, bolts or the like. Likewise the rivets for fixing the tongues can be replaced with screws and the studs 44 by screws or rivets.

Around each hole 92, a radial bearing area 93 is provided for the head of the screws 10. These areas 93 belong to the radial area 91, which belongs to the peripheral area 91, 94 whilst being substantially in the same transverse plane as the radial surfaces 94, also belonging to the peripheral area of the coupling surfaces 7. As a variant a slight axial offset can exist between the said surfaces 91, 94.

Each bracing area 81, 82 has external ribs 81 each connected to a radial bearing area 93. These ribs surround the screws 10, being located radially above them. A slight clearance exists in practice between the screws 10 and ribs 81, the end parts of which are machined in order to form centring surfaces able to cooperate with the internal periphery of the flange 11 of the plate 1.

The external ribs 81 are connected together by internal ribs 82.

More precisely each area 81, 82, has, between the passage holes 92, internal stiffening ribs 82 oriented axially overall, in alternation with external stiffening ribs 81 oriented axially overall and situated radially towards the outside opposite its holes 92 whilst passing round them as closely as possible.

The bottom of the internal ribs 82 is offset radially inwards between the holes 92, and it is for this reason that the ribs 82 are for convenience referred to as the internal ribs since they are situated radially more towards the inside than the ribs 81.

Thus the bracing areas 81, 82 having a corrugated shape, the internal stiffening ribs 82 being rounded in shape.

In order to stiffen the cover 6 radially, according to the invention, it is proposed that the radial coupling surfaces 7 be delimited circumferentially by internal stiffening ribs 82, which connect a said coupling surface 7 to the adjacent external stiffening ribs 81 and that the internal stiffening ribs 82 be inclined in the axial direction going from their free end to the radial support surface 91 of the bracing areas 81, 82.

Thus (FIG. 5) each coupling surface 7 is delimited circumferentially by two axially oriented shoulders 75 directed in the opposite direction to the base 60 of the cover 6, the said shoulders being formed by the section of the relevant internal ribs 82.

The radial surfaces 91 are therefore stiffened by the ribs 82 and the coupling surfaces 7.

Figure 5:
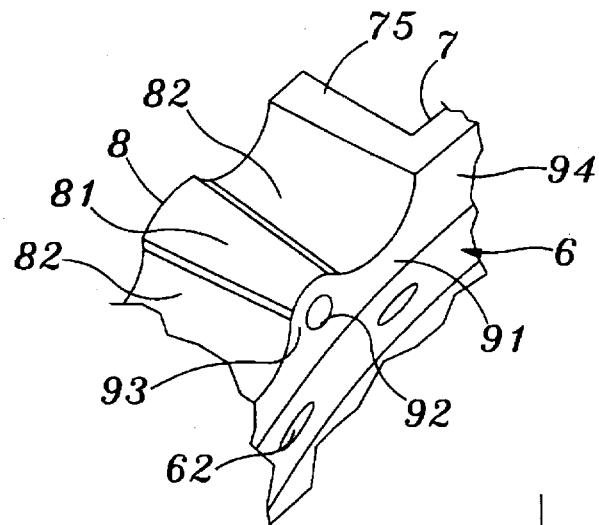
FIG. 5 is a partial perspective view of a cover according to the invention.

As can be seen in FIG. 5, the internal ribs 82 splay out in the axial direction going from their free end to the radial bearing surface 91 of the bracing areas 81, 82. They are therefore wider at their area of connection to the surface 91.

Thus the external ribs 81 are less wide at their area of connection to the radial surface 91 of the bracing areas 81, 82, their free end being broadened, so that these external ribs 81 have broadened centring surface areas for cooperating with the shoulder 11 of the plate 1.

The radial bearing areas 93 have a reduced circumferential width, dictated by the size of the heads of the fixing members 10.

Thus the areas 91 are well supported and have a high degree of stiffness.

It will be appreciated that, by virtue of the invention, the space available between the thrust plate 4 and the external stiffening ribs 81 is occupied to the maximum possible extent.

As will have been understood, the angle of inclination of the internal ribs 82 depends on the shape of the thrust plate 4.

A slight strip of material exists between the skirt 61 and the bottom of the internal ribs 82.

It will be noted that there is no need to press out the skirt 61 for the head of the fixing members 10 to pass. This results from the fact that there is no need to provide a hole at the area of connection of the external ribs 81 with the areas 93.

Here the pressings 62 are located in the vicinity of the bottom of the internal ribs 82, so that two consecutive pressings 62 frame a hole 92.

Thus the deformations of the retaining ring 64 in service are minimised further.

In order to stiffen the cover further, provision is made to provide the radial bearing surfaces with an axially oriented shoulder 70 directed towards the base of the cover 60. This shoulder extends at the external periphery of the radial coupling surfaces 7, in the opposite direction to the shoulder 75 delimiting such a surface.

Thus each radial coupling surface 7 is stiffened by at least three shoulders 75, 70.

It will be noted, when the mechanism 6 is not yet fixed to its reaction plate 1, that the heads of the studs 44 are protected by the shoulder 70.

Figure 6:
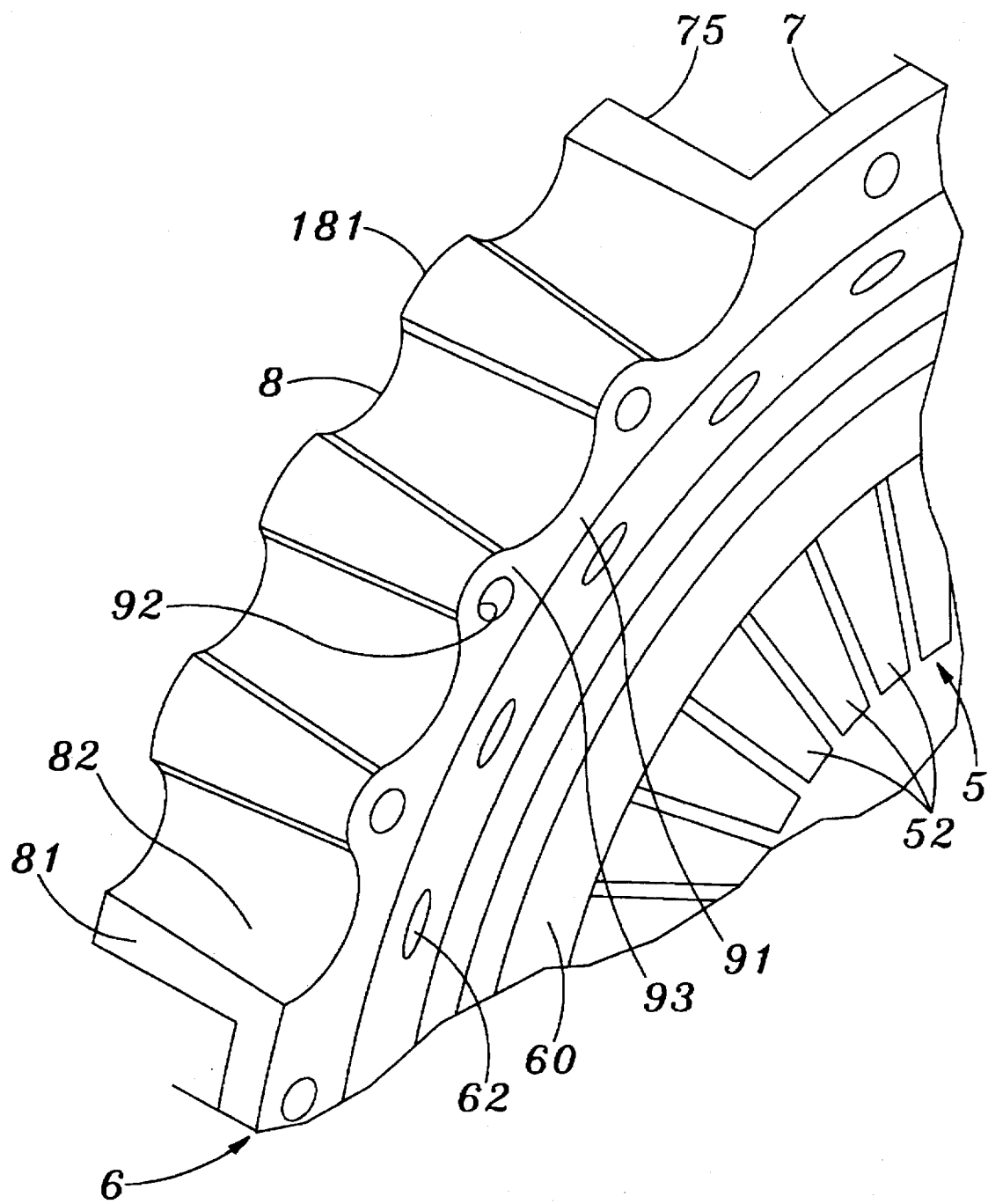
FIG. 6 is a view similar to FIG. 5 for another example embodiment.

Naturally the present invention is not limited to the example embodiment described. Thus in FIG. 6 the radial coupling surfaces 7 have no shoulder 70 and the external ribs 81 are machined deeply at 181 at their free end for nesting of the bracing areas in the reaction plate 1.

Naturally this depends on the application, given that in FIGS. 1 to 5 the machining of these bearing areas is of reduced thickness.

The clutch can be of the pushed type as described in the above-mentioned document FR-A-2 300 933.

Naturally the internal stiffening ribs 82 can have a less corrugated shape, all this depending on their inclination.

As emerges clearly from the description and drawings, whilst in FIGS. 1 to 6 the cover was metallic, it becomes possible, by virtue of the radial stiffening of the cover according to the invention, to produce the said cover from plastic reinforced with fibres such as glass fibres.

I claim:

1. Single-piece cover, having an axis with, on an external periphery, an alternation of radial coupling surfaces (7) for coupling to a thrust plate (4) and areas (8) for fixing to a reaction plate (1), each fixing area (8) having an axial bracing area (81, 82) opposite a radial bearing surface (91) having a plurality of holes (92) for fixing members (10) to pass, in which each said bracing area (81, 82) has an alternation of internal stiffening ribs (82) having a free end and external stiffening ribs (81), characterized in that the radial coupling surfaces (7) are delimited circumferentially by internal stiffening ribs (82), which connect said coupling surfaces (7) to the adjacent external stiffening ribs (81), in that the internal stiffening ribs (82) are inclined in the axial direction going from their free end to the radial bearing surface of the bracing areas (81, 82), and in that the internal stiffening ribs (82) splay out in the axial direction going from their free end to the radial bearing surface (91) of the bracing areas (81, 82).

2. Cover according to claim 1, characterised in that the radial coupling surfaces (7) have at their external periphery an axially oriented stiffening shoulder (70) extending in the direction of a base (60) of the cover.

3. Cover according to claim 1, in which an annular skirt (61) oriented axially overall connects the radial bearing surfaces (91) of the bracing areas (81, 82) to a base (60) directed radially towards the axis of the cover (6) and in which the skirt (61) has, at a point where said skirt joins said base (60), local pressings (62) forming on the internal face of the cover (6) axial projections (63) designed to center a supporting retaining ring (64), characterized in that the local pressings (62) are located in a vicinity of a bottom of the internal stiffening ribs (82).

4. Cover according to claim 1, characterised in that the cover is made from plastic reinforced with fibres.

5. Clutch mechanism for motor vehicles, having a cover (6) and a thrust plate (4) which is coupled with respect to the cover (6) and mounted so as to be axially movable vis-a-vis the cover, and a diaphragm acting between said cover (6) and said thrust plate (4), the assembly thus formed being designed to be attached by the external periphery of the cover (6) to a reaction plate (1) for controlled clamping of a friction disc (22) between the plates, characterized in that said cover has an axis with, on an external periphery, an alternation of radial coupling surfaces (7) for coupling to a thrust plate (4) and areas (8) for fixing to a reaction plate (1), each fixing area (8) having an axial bracing area (81, 82) opposite a radial bearing surface (91) having a plurality of holes (92) for fixing members (10) to pass, in which each said bracing area (81, 82) has an alternation of internal stiffening ribs (82) having a free end and external stiffening ribs (81), characterized in that the radial coupling surfaces (7) are delimited circumferentially by internal stiffening ribs (82), which connect said coupling surfaces (7) to the adjacent external stiffening ribs (81), in that the internal stiffening ribs (82) are inclined in the axial direction going from their free end to the radial bearing surface of the bracing areas (81, 82), and in that the internal stiffening ribs (82) splay out in the axial direction going from their free end to the radial bearing surface (91) of the bracing areas (81, 82).

* * * * *